Patented Mar. 11, 1952

2,588,660

UNITED STATES PATENT OFFICE 2,588,660

MOLDING COMPOSITIONS

Arthur F. Roche, Freeland, and Raymond M. Price, Midland, Mich., assignors to The Dow Chemical Company, Midland, Mich., a corporation of Delaware No Drawing. Application March 31, 1950,
Serial No. 153,301

5 Claims. (Cl. 260—33.2)

This invention concerns new molding compositions comprising thermoplastic monovinyl aromatic resins together with certain agents for producing a nacreous or mother-of-pearl appearance. It pertains more particularly to molding compositions comprised essentially of polystyrene and a polyethylene glycol and relates to a method of making the same.

It is known to incorporate a polyalkylene oxide or a polyalkylene glycol with polystyrene resins as mold release agents or lubricants. It has been proposed that an amount of the polyalkylene glycol corresponding to one per cent by weight or less of the resin is sufficient to provide satisfactory improvement in the release properties without producing a deleterious effect on other characteristics of the resin, e. g. light stability or water absorption. The polyalkylene glycols are usually employed as mold release agents in amounts such that the glycols are completely soluble in the solid resins so as to avoid the formation of opaque or translucent moldings.

It has now been found that when polyethylene glycols are intimately incorporated with thermoplastic monovinyl aromatic resins, e. g. polystyrene, in amounts greater than the solubility of the polyalkylene glycol in the solid resin that the resulting compositions can be molded by usual injection molding operations to form articles which possess a nacreous or mother-of-pearl appearance. It has further been found that the the compositions when molded, particularly by injection molding operations, form articles which also possess excellent elongation and impact strength and are resistant to breakage by flexing.

Accordingly, the invention comprises molding compositions consisting principally of a thermoplastic monovinyl aromatic resin, preferably polystyrene, having intimately incorporated therewith a polyethylene glycol in amount exceeding the solubility of the polyethylene glycol in the solid polymer, which compositions can be molded by usual compression or injection molding operations to form articles having an opaque, nacreous, or mother-of-pearl appearance, together with improved impact strength and elongation.

Polystyrene is the preferred monovinyl aromatic polymer, although the resinous thermoplastic polymers and copolymers of other monovinyl aromatic compounds such as para-methylstyrene, meta-ethylstyrene, ortho, para-dimethylstyrene, ortho,para-diethylstyrene, para-chlorostyrene, isopropylstyrene, ortho-methyl- para-isopropylstyrene or ortho,para-dichlorostyrene, or copolymers of styrene with alpha-methylstyrene, or copolymers of one or more of any of these compounds with styrene, or alpha-methylstyrene, may be used. The term "monovinyl aromatic polymer" as used herein is intended to include the thermoplastic polymers and copolymers of monovinyl aromatic compounds having the vinyl radical directly attached to a carbon atom of an aromatic nucleus, which compounds may also contain one or more alkyl or halogen atoms as nuclear constituents, just described.

The polyethylene glycols suitable for use in preparing the molding compositions are relatively long chain glycols, or diols, containing the recurring oxyethylene group ($OC_2H_4$) and having an hydroxyl group (OH) attached to the terminal carbon atoms of the oxyethylene chain. The compounds may be prepared by reaction of ethylene oxide with water, ethylene glycol, or a lower polyethylene glycol, e. g. diethylene glycol or triethylene glycol, in the presence of an alkaline catalyst and with the degree of polymerization controlled to form a product having the desired molecular weight. Polymers varying from viscous liquids to solids are available and are known to the trade as "Carbowax" products. The products are usually referred to as having given molecular weights or average molecular weights. It is to be understood that the products stated to have a given molecular weight, e. g. of 600, usually consist of a mixture of polyethylene glycols of different molecular weights, some greater than, and some less than, the given molecular weight. In other words, the molecular weight given is that of the mass, as determined by test, and is an average value.

The polyethylene glycols to be used in preparing the new molding compositions should have a molecular weight of from 200 to 1200, preferably a molecular weight between 400 and 1000, although polyethylene glycols having somewhat higher average molecular weights may be used.

The polyethylene glycols are usually employed in amounts corresponding to from 5 to 10 per cent by weight of the combined weight of the same and the thermoplastic monovinyl aromatic resin, but an amount of the polyethylene glycol of from 5 to 8 per cent is preferred. In general, larger proportions of the polyethylene glycols just described tend to exude or bleed from the polymeric compositions and lesser proportions of the polyethylene glycols are less effective, or ineffective, to cause formation of products of high impact strength and of pleasing nacreous or mother-of-pearl appearance.

In preparing the new compositions it is important that the polyethylene glycol be incorporated uniformly throughout the thermoplastic polymer in order to obtain compositions which can be molded to form articles having improved impact strength, elongation and a nacreous appearance. The polyethylene glycol may be incorporated with the polymer, e. g. polystyrene, by mechanically agitating the heat-plastified polymer with the polyethylene glycol by a rolling, kneading, or extrusion operation, or by dissolving the polyethylene glycol in monomeric styrene and thereafter polymerizing the styrene by heating the mixture in bulk, i. e. in the substantial absence of inert liquid media, in the presence or absence of a polymerization catalyst such as benzoyl peroxide, di-tertiary-butyl peroxide, or tertiary-butyl hydroperoxide. The compositions may also be prepared by mixing the polyethylene glycol with the granular polymer, e. g. polystyrene, heating the mixture to a temperature above the melting point of the polymer until the mixture coalesces to a homogeneous mass and thereafter cooling the mixture. In all such methods the polyethylene glycol is preferably incorporated with the polymer in the substantial absence of air or oxygen in order to reduce the tendency toward deterioration of the heat-plastified polymer. The polyethylene glycol is usually incorporated with the polymer by feeding a mixture of the granular polymer and the polyethylene glycol into contact with surfaces of heated rolls adapted for continuously forwarding and discharge of the mixture through a complementary heated barrel by extrusion. An apparatus suitable for incorporating the polyethylene glycols with a thermoplastic monovinyl aromatic resin, e. g. polystyrene, is described in U. S. Patent 2,488,189. Pigments or dyes may also be incorporated with the resinous compositions.

In practice, the polyethylene glycols are intimately incorporated in the desired proportions with a thermoplastic monovinyl aromatic resin by any of the methods just described, i. e. by dissolving the polyethylene glycol in the polymerizable monomeric compounds, e. g. styrene, and polymerizing the mixture in bulk, or by heating a mixture of the solid resin and the polyethylene glycol in the desired proportions to a heat-plastifying temperature and mechanically agitating the mixture. Thereafter, the solid polymeric composition is crushed or ground to a size suitable for use as a molding powder.

The manner in which the polymeric compositions are molded to form articles of manufacture has an effect upon the appearance and also upon the properties, impact strength, elongation and flexural strength of the molded articles. In this connection, it may be mentioned that the new compositions are particularly suitable for the manufacture of articles having a nacreous appearance, together with good impact strength and elongation by usual injection molding operations.

The following examples illustrate ways in which the principle of the invention has been applied, but are not to be construed as limiting the invention.

EXAMPLE 1

In each of a series of experiments, a mixture consisting of granular molding grade polystyrene and a polyethylene glycol having an average molecular weight of 600, in the proportions indicated in the following table was sealed in vacuum in a closed glass container and heated to a temperature of 200° C. over a period of 2.5 hours, then cooled. The polymer was melted and the mixture had coalesced to form an opaque solid mass. It was removed from the container and crushed to a granular form. The compositions from each of the experiments were injection molded under a pressure of 9000 pounds per square inch and a temperature as indicated in the table to form test bars having the dimensions ⅛ inch x ½ inch x 2 inches. These test bars were used to determine the tensile strength in pounds per square inch of cross section, the per cent of its original length by which each product could be elongated under tension before breakage occurred and the impact strength of each product in foot-pounds of energy per inch of notch, applied as a sharp blow to cause breakage of a test bar. Except for the shape and dimensions of the test bars and the weight of the hammer used in measuring impact strength, the procedures in determining the tensile strength and per cent elongation were similar to those described in A. S. T. M. D638–44T and the procedure followed in measuring impact strength was similar to that described in A. S. T. M. D256–43T. Other molded test pieces were used to determine the heat distortion temperature by a procedure of Heirholzer and Boyer A. S. T. M. Bulletin No. 134 of May 1945. Table I identifies each composition by naming the ingredients of the mixture from which it was prepared and giving the parts by weight of each ingredient in the mixture. It also gives the properties determined for each composition. For purpose of comparison, polystyrene alone and compositions outside the scope of the invention are also included in the table as runs 1 2 and 6, respectively.

*Table I*

| Run No. | Compositions | | Molding Temp., °F. | Properties of Compositions | | | | |
|---|---|---|---|---|---|---|---|---|
| | Parts Polystyrene | Parts Polyethylene Glycol | | Impact Strength, Foot-lbs. | Per Cent Elongation | Tensile Strength | Heat Distortion Temp., °C. | Appearance |
| 1 | 100 | 0 | 390 | 1.41 | 2.6 | 7,570 | 81 | Transparent. |
| 2 | 99 | 1 | 380 | 1.54 | 2.7 | 7,800 | 79 | Do. |
| 3 | 95 | 5 | 350 | 2.26 | 12.8 | 6,320 | 71 | Nacreous. |
| 4 | 93 | 7 | 350 | 1.92 | 7.8 | 4,700 | 71 | Do. |
| 5 | 91 | 9 | 350 | 1.67 | 5.5 | 4,370 | 72 | Do. |
| 6 | 89 | 11 | 340 | 1.71 | 5.1 | 4,180 | 73 | Bleeds. |

EXAMPLE 2

A series of experiments similar to those of Example 1 were carried out, wherein the molding compositions were prepared from mixtures consisting of 95 parts by weight of granular polystyrene and 5 parts of a polyethylene glycol having an average molecular weight as indicated in the table. The tensile strength, impact strength, per cent elongation and heat distortion temperature of test bars molded from the compositions at the temperature stated in the table were determined as in Example 1. Table II indicates the average molecular weight of the polyethylene glycol used in preparing the compositions and also gives the properties determined for each composition.

*Table II*

| Run No. | Average Mol. Wt. of Polyethylene Glycol | Molding Temp., °F. | Properties of Compositions ||||| 
|---|---|---|---|---|---|---|---|
| | | | Impact Strength, Foot-lbs. | Per Cent Elongation | Tensile Strength, lbs./sq. in. | Heat Distortion Temp., °C. | Appearance |
| 1 | | 390 | 1.41 | 2.6 | 7,570 | 81 | Transparent. |
| 2 | 200 | 350 | 2.02 | 6.6 | 5,820 | 69 | Nacreous. |
| 3 | 600 | 350 | 2.26 | 12.8 | 6,320 | 71 | Do. |
| 4 | 1,200 | 350 | 2.03 | 3.3 | 5,410 | 73 | Do. |

EXAMPLE 3

In each of a series of experiments, a polymerization mixture consisting of 95 per cent by weight of styrene and 5 per cent of a polyethylene glycol having an average molecular weight as indicated in the following table, together with 0.03 per cent of benzoyl peroxide as polymerization catalyst, based on the weight of the mixture, was polymerized by heating the same in a closed container in accordance with the following schedule of time and temperature conditions: immersing the sealed containers for a period of 90 hours in a liquid bath maintained at a temperature of 79° C.; 8 hours at 95° C.; and thereafter heating for 48 hours in an oven maintained at a temperature of 200° C. The polymeric compositions from each of the experiments were removed from the containers and crushed to a granular form. Portions of each of the compositions were injection molded to form test bars of ¼ by ¼ inch square cross-section. These test bars were used to determine the properties of the compositions as in Example 1, except that the impact strength was determined in foot-pounds of energy applied as a sharp blow to cause breakage of a test bar. Table III identifies the composition by indicating the average molecular weight of the polyethylene glycol used in preparing the same. The table also gives the properties determined for each composition.

*Table III*

| Run No. | Average Mol. Wt. of Polyethylene Glycol | Properties of Compositions |||||
|---|---|---|---|---|---|---|
| | | Impact Strength, Foot-lbs. | Per Cent Elongation | Tensile Strength, lbs./sq. in. | Heat Distortion Temp., °C. | Appearance |
| 1 | | 0.08 | 2.4 | 6,500 | 82 | Transparent. |
| 2 | 380 | 0.136 | 7.9 | 6,210 | 80 | Nacreous. |
| 3 | 600 | 0.148 | 9.1 | 5,460 | 72 | Do. |
| 4 | 1 600 | 0.148 | 6.9 | 4,960 | 74 | Do. |
| 5 | 1,000 | 0.113 | 5.9 | 4,700 | 80 | Do. |

[1] Polyethylene glycol having an average molecular weight of 600 from different source than polyethylene glycol used in run 3.

EXAMPLE 4

In each of a series of experiments, a mixture consisting of 95 parts by weight of granular molding grade polystyrene and 5 parts of a polyethylene glycol having an average molecular weight as indicated in the following table was sealed in vacuum in a glass container and heated to a temperature of 200° C. over a period of 2 hours, then cooled. The polymeric compositions from each of the experiments were crushed to a granular form and molded into test bars of ¼ by ¼ inch square cross-section. These test bars were used to determine the properties of the compositions as in Example 1, except that impact strength was determined as foot-pounds of energy applied as a sharp blow to cause breakage of a test bar. Table IV identifies the composition by indicating the average molecular weight of the polyethylene glycol used in preparing the same and gives the properties determined for each composition.

*Table IV*

| Run No. | Average Mol. Wt. of Polyethylene Glycol | Properties of Products |||||
|---|---|---|---|---|---|---|
| | | Impact Strength, Foot-lbs. | Per Cent Elongation | Tensile Strength, lbs./sq. in. | Heat Distortion Temp., °C. | Appearance |
| 1 | | 0.09 | 2.7 | 6,350 | 80 | Transparent. |
| 2 | 600 | 0.205 | 6.0 | 6,150 | 73 | Nacreous. |
| 3 | 950 | 0.121 | 6.3 | 5,250 | 71 | Do. |
| 4 | 1,200 | 0.232 | 3.2 | 5,210 | 70 | Do. |

Other modes of applying the principle of the invention may be employed instead of those explained, change being made as regards the methods or compositions herein disclosed, provided the steps or ingredients stated by any of the following claims or the equivalent of such steps or ingredients be employed.

We claim:

1. A molding composition comprising as its principal component, a solid thermoplastic monovinyl aromatic resin and, uniformly incorporated with said resin, a polyethylene glycol having a molecular weight between 200 and 1200 in amount corresponding to from 5 to 10 per cent by weight of the combined weight of the polyethylene glycol and the resin.

2. A molding composition comprising as its principal component, a solid thermoplastic monovinyl aromatic resin and, uniformly incorporated with said resin, a polyethylene glycol having a molecular weight between 400 and 1000 in amount corresponding to from 5 to 8 per cent by weight of the combined weight of the polyethylene glycol and the resin.

3. A molding composition comprising solid polystyrene having uniformly incorporated therewith a polyethylene glycol having a molecular weight between 200 and 1200 in amount corresponding to from 5 to 10 per cent by weight of the combined weight of the polyethylene glycol and the polystyrene.

4. A molding composition comprising solid polystyrene having uniformly incorporated therewith a polyethylene glycol having a molecular weight between 400 and 1000 in amount corresponding to from 5 to 8 per cent by weight of the combined weight of the polyethylene glycol and the polystyrene.

5. A molding composition comprising solid polystyrene having uniformly incorporated therewith a polyethylene glycol having an average molecular weight of 600 in amount corresponding to from 5 to 8 per cent by weight of the combined weight of the polyethylene glycol and the polystyrene.

ARTHUR F. ROCHE.
RAYMOND M. PRICE.

REFERENCES CITED

The following references are of record in the file of this patent:

UNITED STATES PATENTS

| Number | Name | Date |
| --- | --- | --- |
| 2,353,228 | Ducca | July 11, 1944 |